United States Patent
Steeves et al.

(10) Patent No.: US 9,112,702 B2
(45) Date of Patent: Aug. 18, 2015

(54) ALTERNATE AUTHENTICATION

(75) Inventors: David Steeves, Seattle, WA (US); Rajesh Viswanathan, Woodinville, WA (US); Todd Buiten, Kent, WA (US); William J. Reid, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1545 days.

(21) Appl. No.: 12/431,794

(22) Filed: Apr. 29, 2009

(65) Prior Publication Data

US 2010/0281252 A1 Nov. 4, 2010

(51) Int. Cl.
H04L 9/32 (2006.01)

(52) U.S. Cl.
CPC ............ H04L 9/3213 (2013.01); H04L 9/3234 (2013.01); H04L 9/3271 (2013.01); H04L 9/3297 (2013.01)

(58) Field of Classification Search
CPC ... H04L 9/3213; H04L 9/3297; H04L 9/3271; H04L 9/3234
USPC .......... 726/6, 7, 9, 12, 26; 713/100, 150, 155, 713/168, 182, 176, 186; 709/224
See application file for complete search history.

(56) References Cited

U.S. PATENT DOCUMENTS

| | | | |
|---|---|---|---|
| 5,590,198 A | 12/1996 | Lee et al. | |
| 6,199,114 B1 | 3/2001 | White et al. | |
| 7,174,454 B2 | 2/2007 | Roskind | |
| 7,461,399 B2 | 12/2008 | Juels et al. | |
| 2005/0193198 A1 | 9/2005 | Livowsky | |
| 2007/0016796 A1 | 1/2007 | Singhal | |
| 2009/0158034 A1* | 6/2009 | Gu et al. | 713/156 |
| 2009/0217368 A1* | 8/2009 | Buss et al. | 726/9 |
| 2009/0271847 A1* | 10/2009 | Karjala et al. | 726/6 |
| 2010/0318806 A1* | 12/2010 | Hardt | 713/176 |

OTHER PUBLICATIONS

Sailer et al., "Pervasive Authentication Domains for Automatic Pervasive Device Authorization", 2004, http://ieeexplore.ieee.org/ielx5/8997/28557/01276921.pdf?arnumber=1276921.

"Alternative Technology to Offer Gemalto's Web-based Authentication Device Administration", Apr. 8, 2008, pp. 1-2, http://www.smartcardalliance.org/articles/2008/04/08/alternative-technology-to-offer-gemaltos-web-based-authentication-device-administration.

(Continued)

Primary Examiner — Brandon Hoffman
Assistant Examiner — Nega Woldemariam
(74) Attorney, Agent, or Firm — Bryan Webster; Kate Drakos; Micky Minhas

(57) ABSTRACT

A user may utilize an existing digital identity to authorize the user's access to security-enabled device operations, where the security-enabled device comprises a cryptographic chip. The device can receive a user authentication token from the digital user identification service, which authenticates a user's identity. Further, the security-enabled device can validate the user authentication token, and provide the user access to device security operations on the security-enabled device if the user authentication token is successfully validated, allowing the user to reset their security access information for the device.

20 Claims, 7 Drawing Sheets

(56) References Cited

OTHER PUBLICATIONS

"SafeNet MyID Card Management System", 2009, pp. 1-2, http://www.safenet-inc.com/products/cms/index.asp.
"Iron Key", 2008, http://www.tribecaexpress.com/pdf_files/IronKey-Personal-data-sheet.pdf.
"SafeGuard Device Encryption", 2006-2008—Utimaco Safeware AG, http://www.vasco.com/Utimaco/documents/sgn_device_encryption_datasheet_en.pdf.
Hayashi et al., "Mental Trapdoors for User Authentication on Small Mobile Devices", Aug. 2007, Carnegie Mellon University, http://www.cylab.cmu.edu/research/techreports/cmucylab07011.pdf.

* cited by examiner

ALTERNATE AUTHENTICATION

BACKGROUND

In the digital age, individuals and enterprises often find a need to secure information and/or hardware. For example, smart cards are often used by enterprises, and given to individuals, to provide access to secure environments (e.g., buildings, networks, financial accounts, etc.). Further, information can often be secured by utilizing computer-based hardware, comprise some form of cryptographic chip. A cryptographic chip typically provides a secure computing environment utilizing cryptographic services, including authentication primitives, to control access to data stored on a storage device. Access to a security-enabled device usually involves a shared secret (e.g., password) set up between the device and a user. Further, an administrator of the security-enabled device may also have a shared secret to access the device in case the user forgets their access information or the device needs to be managed in another way.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Portable storage devices (e.g., USB flash drive, SD memory cards, and other types of storage devices) can comprise a cryptographic chip to provide security for the device, whereby only by presenting necessary security information will a user be able to access information and/or functionality provided on the device. Typical authentication systems for security-enabled devices rely on shared secrets to access operation on the device. For example, when a user first gets a device they (or an administrator) may set up a password that is a shared secret between the user and the device. In order to access device operations the user may be asked to supply the shared secret.

Further, these types of security-enabled devices (e.g., particularly smart cards used to access systems) are often managed by an administrator that can also access the information using an administrator's shared secret with the device. In the alternate, the administrator may have a copy of the user's shared secret, which can be used to access the device. When a user forgets and/or loses their shared secret the device's authentication process may require alternate credentials, or an administrator to reset the password. However, there may not be an administrator available if the device is personally owned/managed by the user (e.g., an encrypted, personal USB flash drive, or smart card, etc.). Further, if the user forgets one set of login credentials it is likely they can forget/lose an alternate set of login credentials.

As provided herein, techniques and systems that provide a user with an alternate authentication for a security-enabled device, where a user's shared secret security information may have been lost or forgotten, for example. A user may utilize an existing digital identity, such as one that a user may have established with a web/Internet-based portal, or over a private network or Intranet, for example, to provide user authentication to access device operations. Upon accessing the security-enabled device by the alternate authentication, a user may be able to reset their security access information (e.g., password) in place of their forgotten information, for example.

In one embodiment, authorizing user access to security-enabled device operations, where the security-enabled device comprises a cryptographic chip, can comprise receiving a user authentication token at the security-enabled device. In this embodiment, the token can comprise an digital user identification service's authentication of a user's identity. For example, where the user authenticates their identity with an Internet-based user identification service, the service can provide the authentication to the device. Further, the device can validate the user authentication token, and provide the user access to device administrative operations on the security-enabled device, if the user authentication token is successfully validated, allowing the user to reset the device's security access information (e.g., password).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
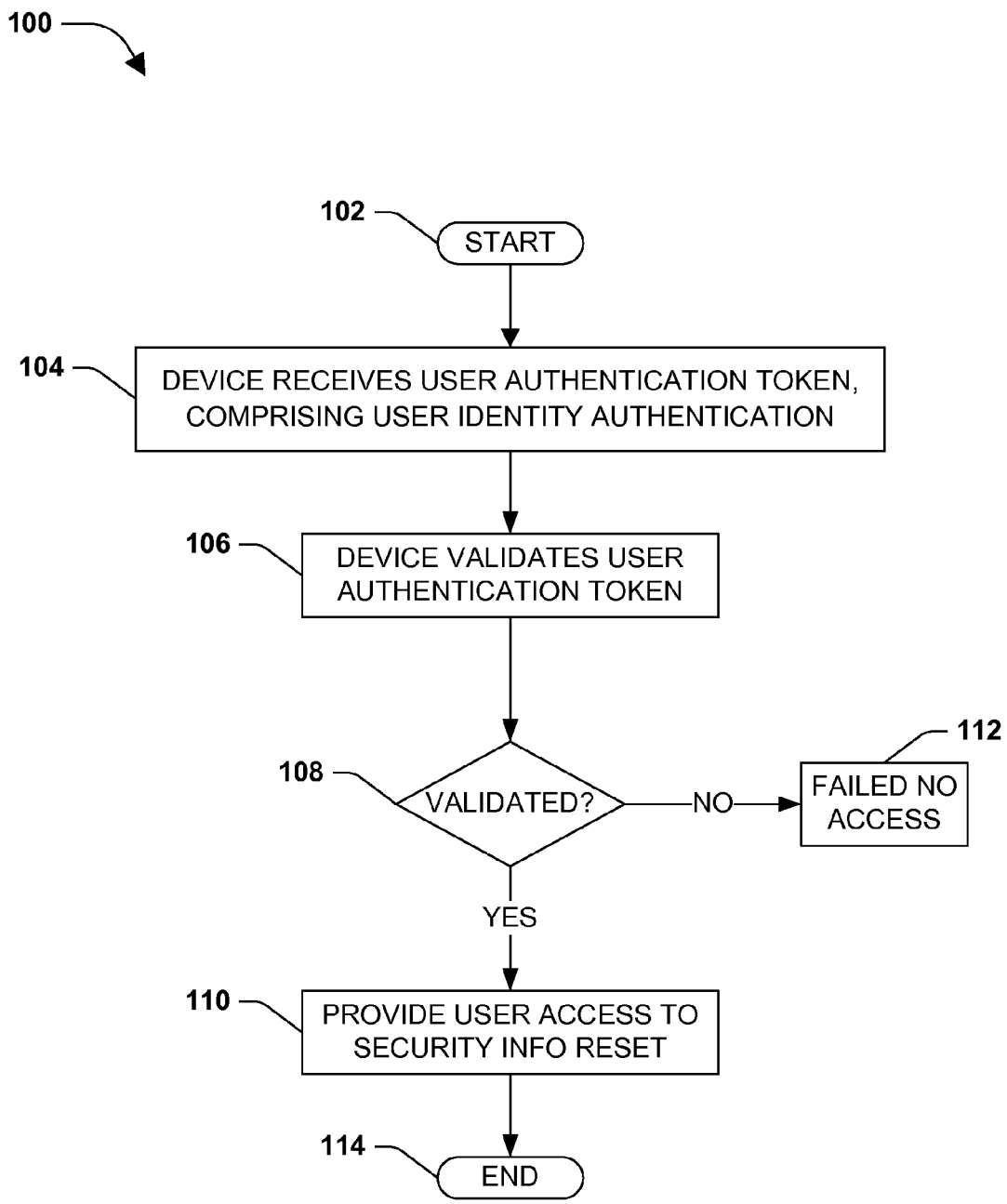
FIG. 1 is a flow chart diagram of an exemplary method for using a previously configured digital identity as an alternate authentication for authorizing user access to security-enabled device operations.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that allows a user of security-enabled device (e.g., a USB flash drive having a secure computing environment with cryptographic services, a smartcard, SIM chip/card, other flash-based memory, etc.), who may have forgotten their security access information (e.g., username and/or password), to access the security-enabled device using an alternate authentication. In one embodiment, the alternate authentication can provide the user with access to security operations for the device that allow the user to reset their access information (e.g., password). FIG. 1 is a flow diagram illustrating an exemplary method 100 for using a previously configured digital identity as an alternate authentication for authorizing user access to security-enabled device operations, where the security-enabled device comprises a cryptographic chip.

The exemplary method 100 begins at 102 and involves the security enabled device receiving a user authentication token, where the token comprises an digital user identification service's authentication of a user's identity, at 104. For example, a user may already have an existing digital identity, such as an Internet-based identity, that they use for online services (e.g., Yahoo®, Windows Live®, Google®). In one embodiment, the security-enabled device and the digital user identification service utilized by the user can have a security relationship where the digital user identification service agrees to authenticate a user and provide a user authentication token. The user authentication token can be presented to the security enabled device, for example, directly or through the user.

In one embodiment, the existing security relationship may comprise an agreement that the user authentication provided by the digital user identification service meet a security threshold. For example, a username and password used by a user of the digital user identification service may be compromised by online scammers (e.g., phishing, hacking, other means). Therefore, the security-enabled device may wish to utilize a higher level of security to establish the user's identity. As an example, the digital user identification service may issue a series of challenge-response tests to the user using information that merely the user knows, such as place of birth, mother's maiden name, and other person information, in order to authenticate for the security-enabled device. In this way, in this embodiment, a strong authentication can be used to authenticate the user.

At 106, the security-enabled device can validate the user authentication token provided by the digital user identification service. The user authentication token can comprise particular elements that enable validation by the security-enabled device. In one embodiment, the user authentication token can comprise a public key associated with the digital identification service, which can be checked against a registered public key for the digital identification service to determine if the token came from the expected service (e.g., the service used by the user).

Further, in one embodiment, the security-enabled device may wish to check a level of security provided by the token to match it with the expected level of security for the user's authentication. Validating the token may comprise checking for s strong authentication of the user, as described above. Additionally, when validating the token the security-enabled device may look for a signature from the digital user identification service that identifies the service, for example, as well as providing a particular level of user authentication security, such as with a cryptographic service provider that provides particular contact information for the service.

In another embodiment, the security-enabled device may look for a "trusted timestamp" or some random, once used string (e.g., nonce) with the token to mitigate a potential "replay attack." A replay attack can be used by a malicious user attempting to hack into the security-enabled device, for example, by resending old authentication information. In one embodiment, information for creating a trusted timestamp for a trusted timestamp management infrastructure may be given to the digital user identification service, so that they can include a trusted timestamp with the user authorization token. In turn, the trusted timestamp can be validated by the device to determine whether the token was generated within an acceptable timeframe, such as by the service, and not an old token reused by a malicious user, for example. In this example, a malicious user attempting to use old information to access the device may be stopped, as the timestamp can provide information that the token is expired or no longer valid.

Further, in one embodiment, a random string may be provided to the digital user identification service, such as a cryptographic nonce, that can be included with the token. For example, the user may attempt to authenticate with the service, the service can request a nonce from the device, and the service can then return the nonce with (or within) the token to the device. In this embodiment, the random string can be different for respective requests. In this way, for example, a malicious user attempting to use old information to access the device may be stopped as the string is merely used once. Additionally, in another embodiment, a trusted timestamp can be included with the random string, thereby adding an additional layer of security to the token.

In the exemplary method 100, at 108, if the user authentication token is not validated, the user cannot access the security enabled device, at 112. However, if the token is validated at 108, the user is provided access to one or more of the security-enabled device's administrative operations, at 110. In one embodiment, the security-enabled device may merely provide the user access to administrative operations that can allow the user to change their security access information for the device. For example, the security-enabled device may utilize a username and password that allows a user to access the functionality and/or information on the device. However, a user utilizing the alternate authentication may have forgotten their login information and, once a user authentication token is validated by the device, can merely create a password.

In another embodiment, the security-enabled device may be set up to be used by multiple users, for example, having different levels of access to the operations and information on the device. In this embodiment, once a user authentication token is authenticated, the security-enabled device may provide the user access to merely those administrative operations (e.g., security information access) of the device assigned to the user identity associated with the token. As an example, a device may be used to store personal information about an individual, including medical information. In this example, a medical provider may not have the password (or have forgotten/lost it) to access the medical information on the device. Here, the medical provider can use an digital user identification service to access the security information reset operation of the device assigned to that identity, and retrieve the medical information for an individual, after resetting a password to access it. As an example, the digital user identification service may comprise a service provided over a private medial Intranet, where the medical provider has a pre-existing digital identification set up with the service.

Having provided access to device operations to a user, the exemplary method 100 ends at 114.

In one aspect, a user may acquire a security-enabled device that comprises a cryptographic chip and set it up so that the user's digital identity may be used as an alternate way to access the device. For example, a hardware device, such as a USB flash-drive, SD memory card, SIM card, smartcard, or some other device capable of information storage, may comprise a secure computing environment that provides cryptographic services, including authentication primitives (e.g., cryptographic algorithms) to control access to the device.

Figure 2:
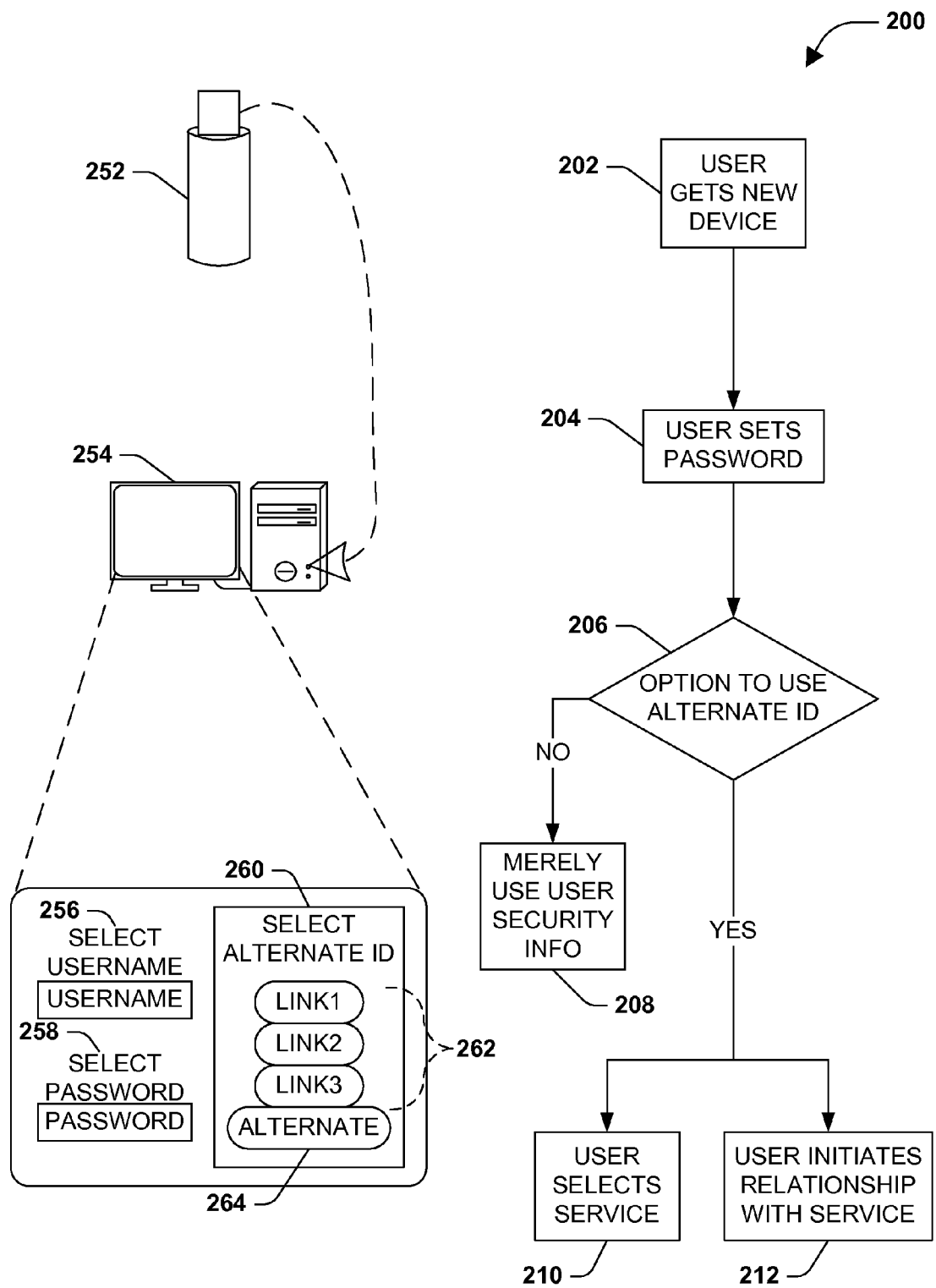
FIG. 2 is an illustration of an exemplary portion of a method whereby a user sets up an exemplary device for alternate authentication using an digital identity.

FIG. 2 is an illustration of an exemplary portion of a method 200 whereby a user sets up an exemplary device for alternate authentication using a digital identity.

At 202, a user may acquire a new security enabled device 252, for example, to store encrypted data, for use as a smart card for accessing a system, or supplied by a medical provider for medical records. In this exemplary embodiment, 200, the user may initially set up the device 252 by connecting it to a computer system 254, and setting up a username 256 and password 258, at 204. For example, typical security-enabled devices issue a challenge response test to a user that uses a shared secret (e.g., password known to both the user and device), which can be set up by the user. In another embodiment, merely a password may be used, for example, particularly where multiple users are not setup for device access.

At 206, the user can decide whether they wish to set up an alternate authentication using an existing digital user identity. A user may decide not to set up an alternate identity, merely relying on the user security information, at 208, to access the device operations. In one embodiment, if the user chooses not to set up an alternate authentication, and they forget their username 256 and/or password 258, for example, the device may provide an ability for an alternate administrative user to access the device to change the security access information. In this embodiment, the administrative user, such as a technical support service or individual administrator (or even a spouse or another trusted individual, for example), may unlock the device to allow the user to update their security information, for example.

If the user chooses to set up the device to use an alternate authentication, at 206, the user may select an alternate identification service to use 260. At 210, the user may select from a list of digital user identification services 262 with which the device 252 has an existing security relationship. Alternately, at 212, the user may decide to use an existing identification from another service 262, thereby initiating creation of a security relationship with the device 252.

For example, the security-enabled device 252 may provide a list of digital identification services 262, such as popular Internet-based services (e.g., Yahoo®, Windows Live®, Google®), with which it has pre-existing security relationships. The user can choose which service they already have an existing identification account, for example, by selecting the link 262. Alternately, for example, if the user wishes to use a service that is not listed, or in an embodiment where the device 252 does not supply a suggested list of services 262, the user can select a link 262 that initiates setting up of the security arrangement. In this way, a user can select which existing online identification to use for alternate authentication, and the device can set up the security arrangement with the service.

Figure 3:
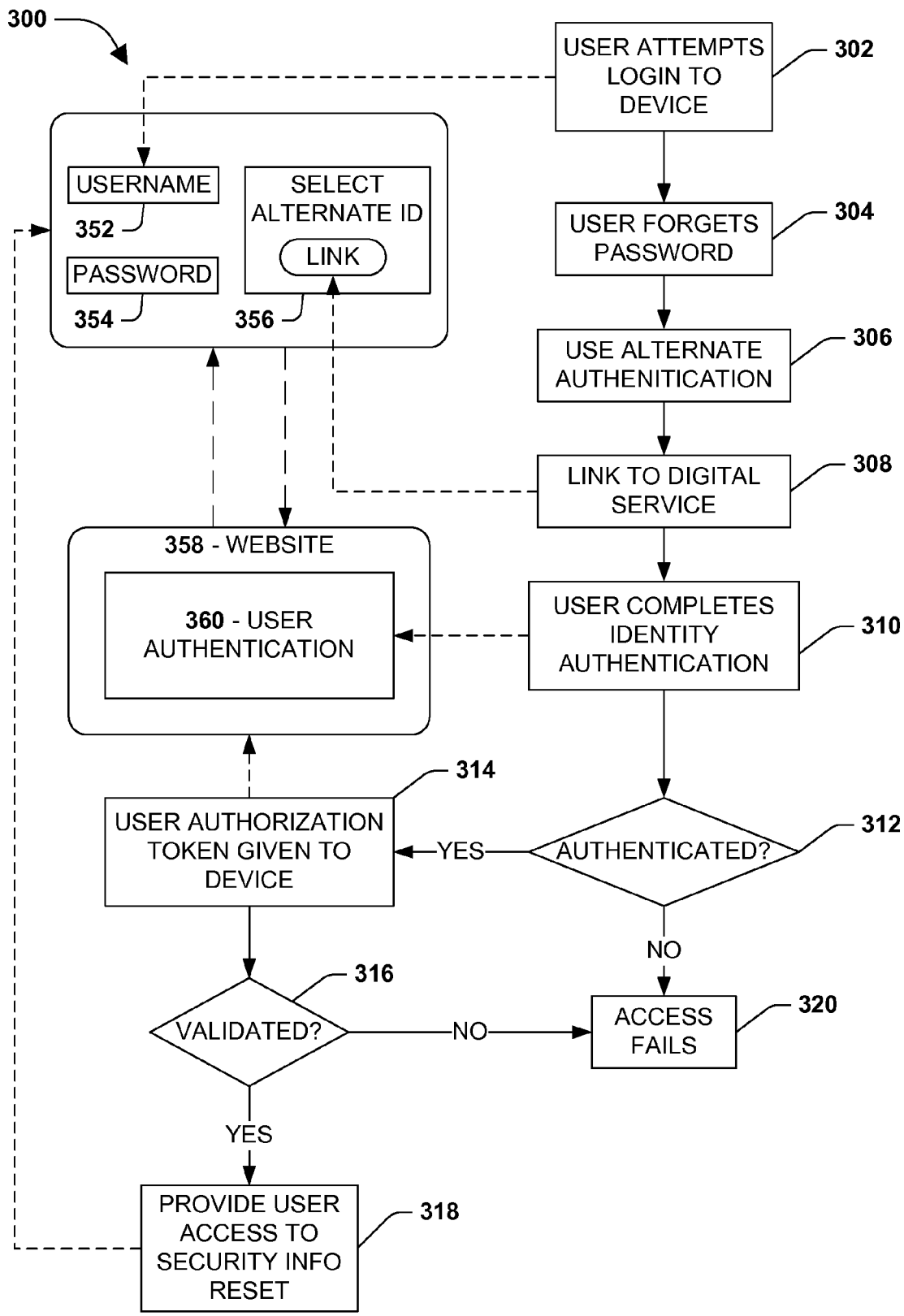
FIG. 3 is a diagram illustrating one exemplary embodiment of a user utilizing the alternate authentication for accessing the device.

In another aspect, the alternate authentication may be used, for example, when a user forgets the login information, such as in FIG. 2, 256 & 258, or if the device has been set up for multiple users. FIG. 3 is a diagram illustrating one exemplary embodiment 300 of a user utilizing the alternate authentication for accessing the device. It will be appreciated that the techniques described herein for accessing the device are not limited to these embodiments.

At 302, a user of a security-enabled device, which has been previously set-up to use an digital identity for alternate authentication, attempts to access the device using their security information, such as their username 352 and password 654. However, at 304, they may have forgotten the password (e.g., or PIN) associated with their username, thereby preventing them from accessing the device.

In this embodiment 300, at 306, the user can be presented with an option to select the alternate identity 356 to access the device. In one embodiment, the device display may present a functional link to the digital identification, which the user can select, at 308. In this embodiment, the link 356 can take the user to the service's website 358, where the user can complete their identity authentication 360, at 310. For example, a user may be directed to a website where they have an existing user account. The website 358 can ask the user to log in using their security information, and/or may ask them for additional information, such as personal questions, in order to confirm the user's identity 360, for example. Further, the security-enabled device may request a strong authentication level, which the service can provide by these additional questions.

At 312, the digital user identification service can attempt to authenticate the user based on their information. If the user is not able to be authenticated, access to the device will fail, at 320. However, if the user is authenticated by the service, a user authentication token can be sent to the device, at 314.

In an alternate embodiment, the user may go to a website for the identification service, independently from the device (e.g., the device may not have a link to the service). Once at the service's website, they can complete the user authentication, which meets a level of security set by the device, and the service can provide a user authentication token to the user. In this embodiment, the user may then provide the token to the device for validation.

In the exemplary embodiment 300, at 316, the device attempts to validate the user authentication token provided by the digital service. As an example, validation may include checking the service's signature, public key, trusted timestamp, and nonce, as well as the actual user authentication. If the validation fails, access to the device for the user also fails, at 320. However, if the device is able to validate the user authentication token, the device can provide access to administrative operations, for example, to change the security information, at 318.

Figure 4:
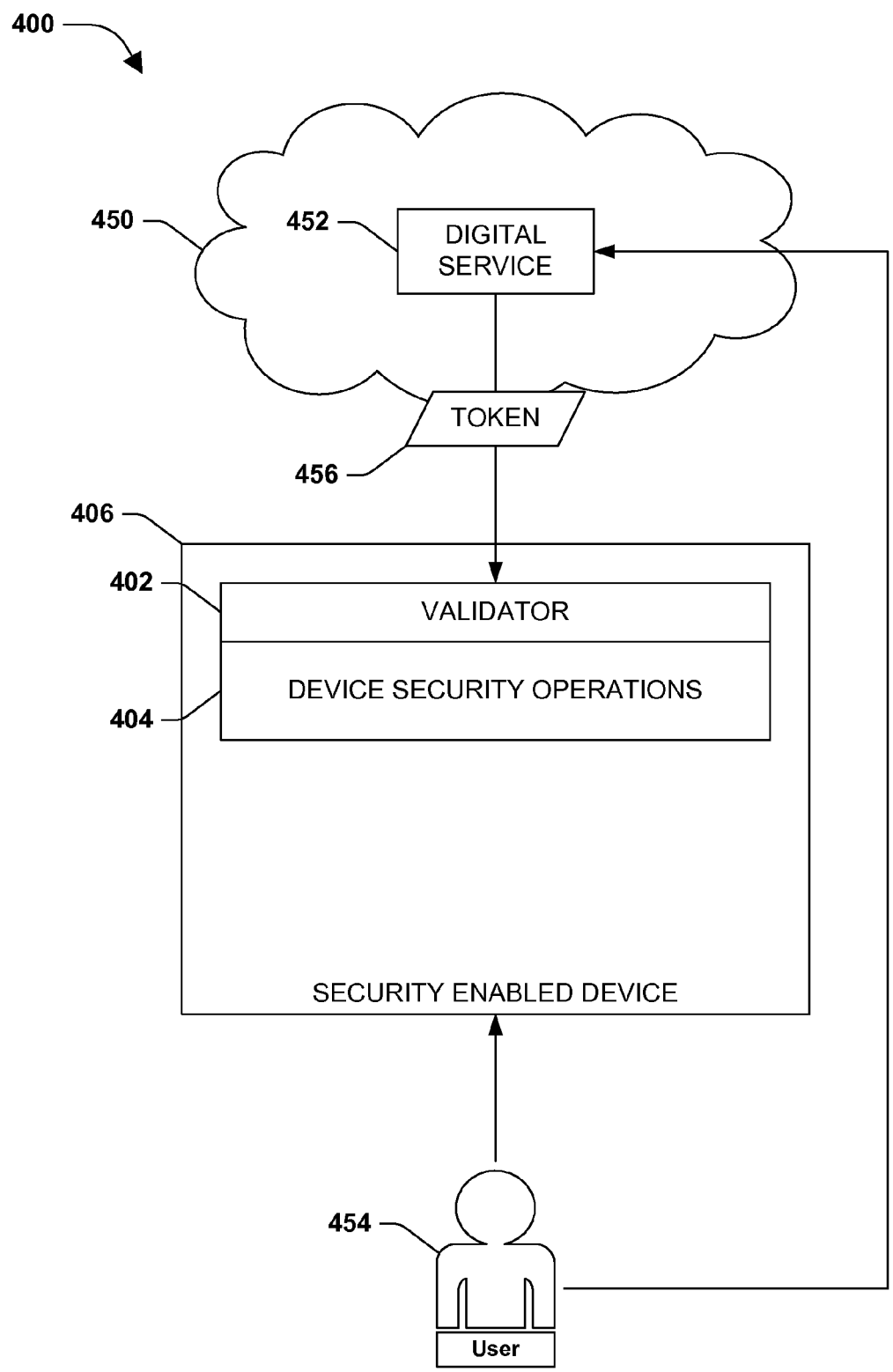
FIG. 4 is a component block diagram of an exemplary system that provides a user with alternate authentication for accessing security-enabled device operations using a previously configured digital identity.

A system may be devised that allows a user of a security-enabled device, for example, using a cryptographic chip (e.g., that may not be managed by an administrator merely the user), to access the device using alternate authentication (e.g., alternate from a username and password). FIG. 4 is a component block diagram of an exemplary system 400 that provides a user with alternate authentication for accessing security-enabled device administrative operations (e.g., to reset a password) using a previously configured digital identity, such as those used to access popular Internet service sites, private digital identifications set up on a private network, or those that may be set up on an Intranet.

A user 454 may have previously set up a digital identification with an existing digital service 452. For example, many popular online web-portals (e.g., MSN®, Live®, Yahoo®, Google®), online social networking sites (e.g., Facebook®, MySpace®, LinkdIn®), and many other online or network services may utilize user identities that are authenticated by the digital services' user authentication (e.g., Internet-based user identification service). In this example, when moving about the Internet 450 a user may be asked to establish their identification at various sites in order to retrieve emails, buy things, and interact with others.

The exemplary system 400 can utilize these relationships to provide an alternate authentication for a security enabled device 406. The exemplary system 400 comprises a user authentication token validator 402, which is configured to validate a user authentication token 456 for the security-enabled device 406 that uses a cryptographic chip. In the exemplary system 400, the user authentication token 456 comprises a digital user identification service's 452 authentication of a user's identity. As an example, in this embodiment, the digital user identification service 452 already has a relationship with the user 454, whereby the service 452 can authenticate a user and provide the device 406 with a user authentication token 456. The token 456 can then be used to validate the user 454 with the device 406.

In this embodiment, the digital user identification service would have a pre-existing security arrangement with the security-enabled device. For example, in order for the device 406 to trust a token 456 from the service 452 that authenticates the user 454, an arrangement can be made prior to first using the alternate authentication where certain security criteria are met. Some examples of security information can include, but not be limited to, a signature identifying the service 452, a shared random security string, and using a trusted time authentication framework to prevent unauthorized users from accessing the device 406.

The exemplary system 400 further comprises one or more device security operation components 404 that are configured to become accessible to a user 454 upon validation of the user authentication token 456 by the user authentication token validator 402, and to provide the user 454 with an ability to reset their security access information for the device 406. For example, the security-enabled device 406 may comprise a plurality administrative functions (e.g., different security login info for different users), separate user storage areas (e.g., for storing and accessing information for different users), and other security-enabled functions (e.g., smart card access for other systems). In one embodiment, the token can merely provide access to an operation that allows the user to change/reset a password for the one they forgot, for example, that is assigned to their particular user ID.

Figure 5:
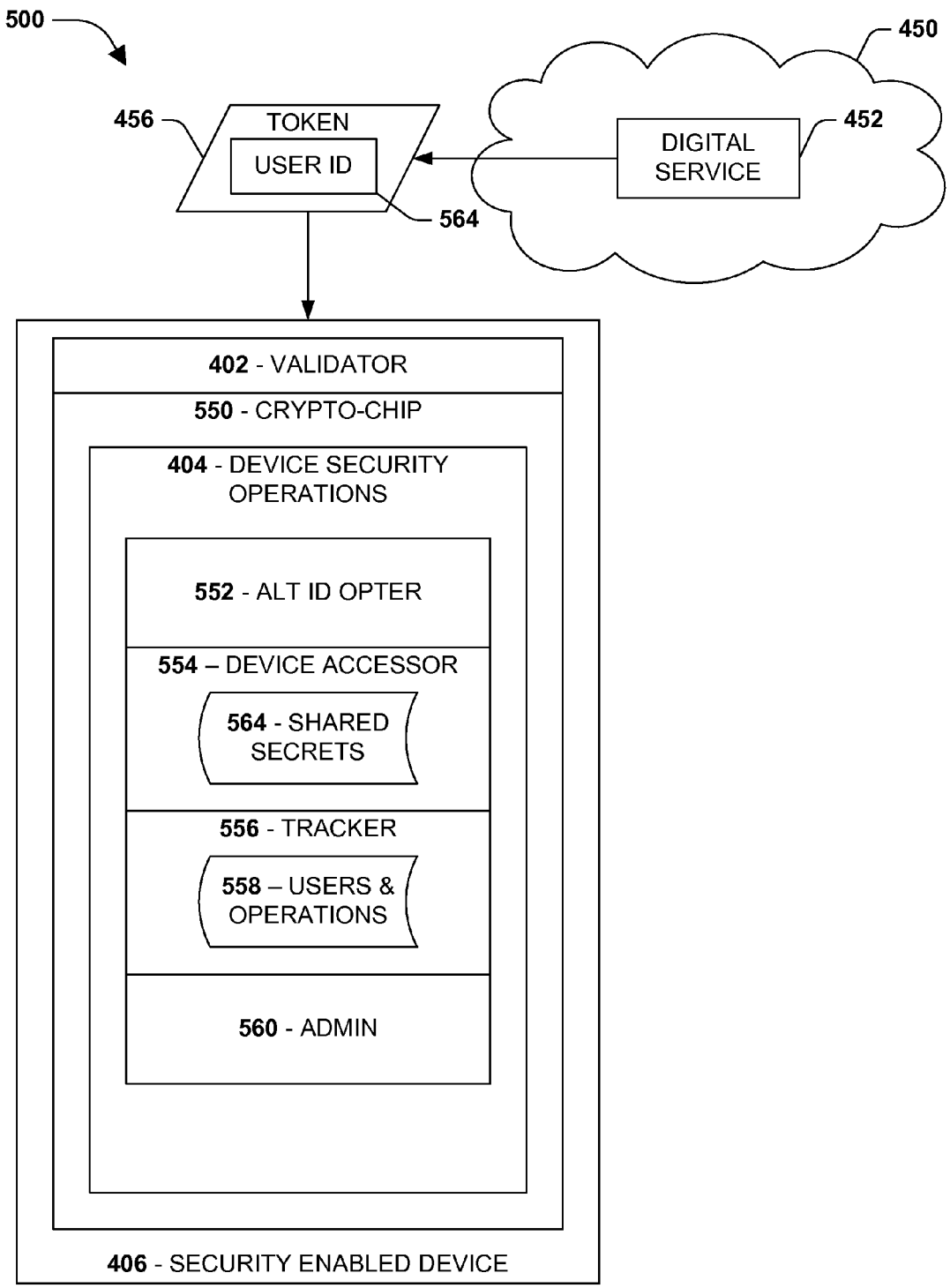
FIG. 5 is a diagram illustrating one embodiment of a system that provides a user with alternate authentication for accessing security-enabled device administrative operations using a previously configured digital identity.

FIG. 5 is a diagram illustrating one embodiment 500 of the system that provides a user with alternate authentication for accessing security-enabled device operations using a previously configured digital identity. In this embodiment, the security-enabled device 406 comprise a cryptographic chip 550, which can be used to provide a secure computing environment for the device, and control access to data stored on the device, for example.

In one embodiment, the cryptographic chip can 550 be configured to provide access to a user without a direct shared secret. For example, typical cryptographic chips utilize a shared secret challenge-response test to get through the security. In this example, either the user provides a username and password, or alternately, if they forget their information, an administrator can access it by providing a username and password (e.g., or looking up the user's information and providing it to the user). Here, the cryptographic chip is configured to allow an alternate authentication of an digital identification, using an authentication token 456 instead of (or as well as) a shared secret.

In the exemplary embodiment 500, the user authentication token 456 can comprise an identification 564 that is associated with one or more particular device security operation components 404 and is configured to allow a user to access merely those device security operation components 404 associated with it. For example, the security-enabled device 406 may be set up so that more than one user can access the device 406, whereas respective users may be able to access merely those areas assigned to the user. In one embodiment, when a user authenticates their identification using the digital user identification service 452, the service 452 can include a user identification 564 with the user authentication token 456. In this way, for example, the device's validator 402 can validate the user and grant access to the device security operations 404 assigned to that particular user ID 564, thereby allowing the user to reset merely their password for device access.

In the exemplary embodiment 500, the device 406 may further comprise an opt-in component 552 that is configured to allow a user to select whether an digital user identification service's authentication is used to access the security-enabled device. For example, a when setting up the device 406, the user can decide whether to allow access to the device 406 using an alternate authentication by activating the opt-in component 552. In this example, if the user activates the opt-in component 552 they may be asked to select a specific digital user identification service 452 that has a pre-existing security arrangement with the device 406. Otherwise, the device 406 may need to initiate a security arrangement with an alternate service with which the user has a pre-existing online identity, for example.

In the exemplary embodiment 500, the device 406 may further comprise a device access component 554 configured to allow user access to the security-enabled device using shared secret security information. For example, while the exemplary system may provide an ability for a user to access the device's security operations 404 using a user authentication token 456, a user may also be able to access the device using a username and password. Further, the device may provide an ability for an administrator shared secret, as well as multiple user shared secret information. These shared secrets 564 (e.g., usernames and passwords) can be stored on the device 406.

In this embodiment 500, the device 406 can further comprise a tracking component 556 that is configured to maintain a list of users and/or user groups allowed to access the security-enabled device 406 and the device operation security components 404 allowed to be accessed by the respective users/user groups, for example, to reset their passwords. As described above, the device 406 may be setup to allow multiple users to access it, whereby respective users have access to certain areas. The tracking component 556 may store a list 558 of users and associated device security operations 404 that respective users are allowed to access to update their security access information. For example, where a device may be used to store personal medical information, a hospital may have an online account with which the device has a security relationship allowing the hospital access particular health records on the device in an emergency.

Further, in this embodiment 500, the device operations 404 may comprise administrative components 560 and functionality components 562. For example, the device may be setup in such a way as to merely allow the alternate authentication to provide access to the administration components 560, so that a user can create or change a password.

Figure 6:
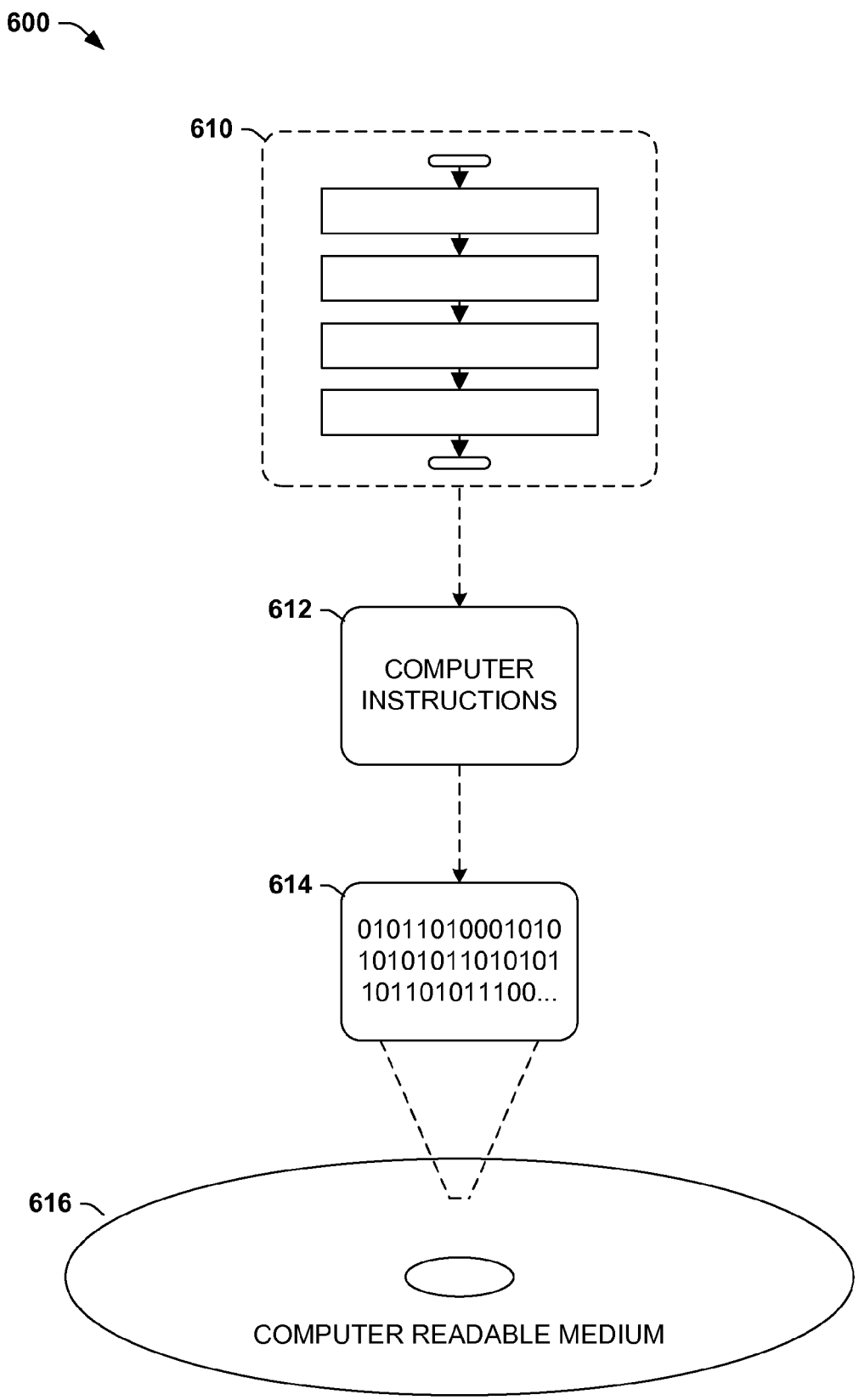
FIG. 6 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 100 of FIG. 1, for example. In another such embodiment, the processor-executable instructions 604 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
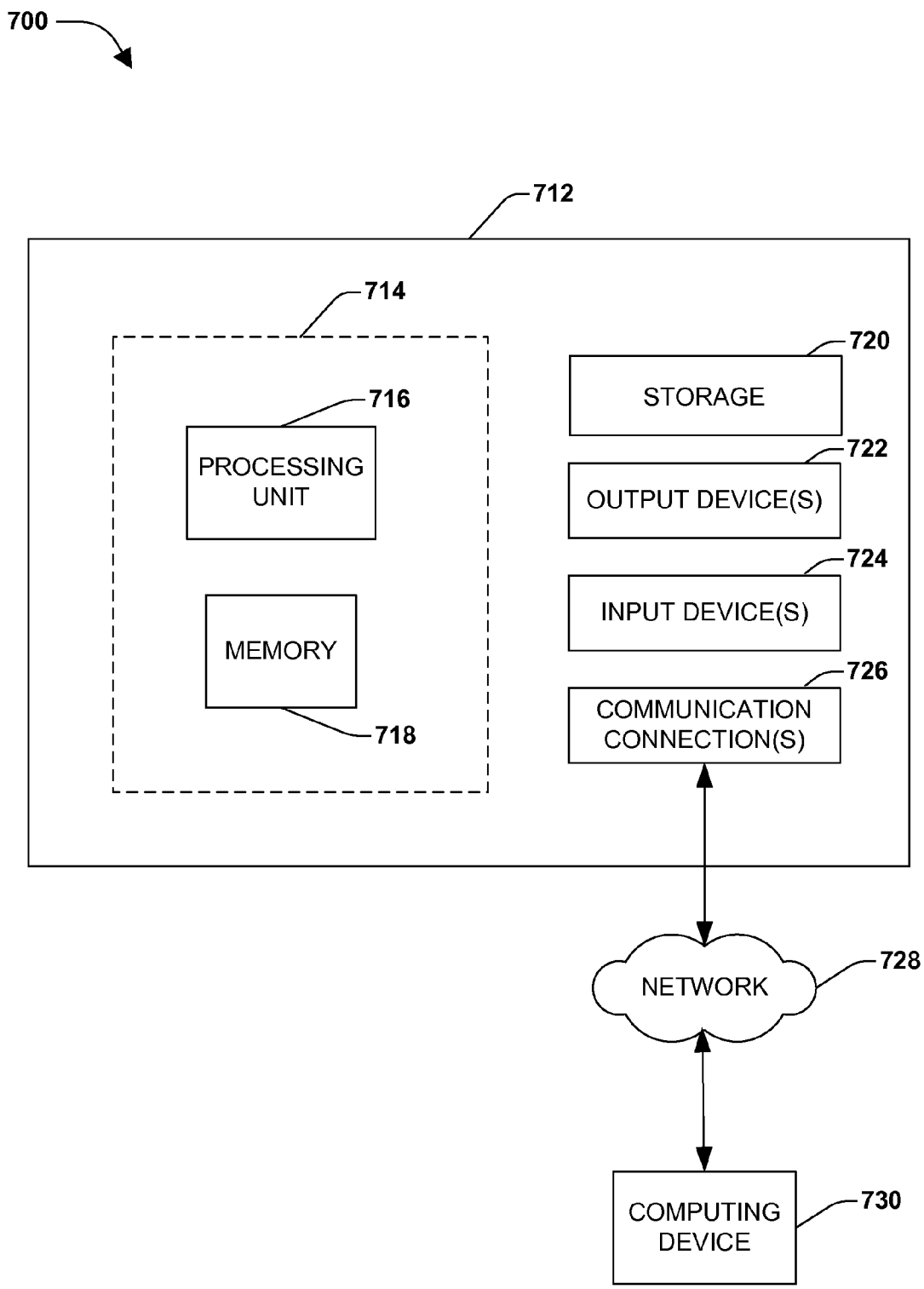
FIG. 7 illustrates an example computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for resetting user authentication credentials for a portable storage device, comprising:
   providing a link to a website when a user attempts to log into a portable storage device, the website associated with a user identification service for authenticating the user;
   responsive to a selection of the link, initiating navigation to the website;
   receiving a user authentication token at the portable storage device responsive to the user identification service authenticating the user;
   validating the user authentication token using a signature of the user identification service within the user authentication token; and
   responsive to the validating the user authentication token, enabling the user to reset user authentication credentials for the portable storage device.

2. The method of claim 1, the website comprising a social network website, and the user identification service authenticating the user based upon receipt of user authentication credentials for the social network website.

3. The method of claim 1, the website comprising an online web portal, and the user identification service authenticating the user based upon receipt of user authentication credentials for the online web portal.

4. The method of claim 1, the user identification service authenticating the user based upon receipt of user authentication credentials for the user identification service, the user authentication credentials for the user identification service different than the user authentication credentials for the portable storage device.

5. The method of claim 1, the portable storage device comprising a storage device operatively coupled to a computing device used by the user to access at least some data stored within the portable storage device.

6. The method of claim 1, the link stored within the portable storage device.

7. The method of claim 1, comprising:
   providing a set of user identification services;
   receiving a selection of the user identification service from the set; and
   storing the link to the website associated with the user identification service responsive to the receiving a selection.

8. The method of claim 1, the portable storage device comprising a solid state device.

9. The method of claim 1, the validating the user authentication token comprising:
   verifying, using the signature of the user identification service within the user authentication token, that the user authentication token is issued by the user identification service.

10. The method of claim 1, the validating the user authentication token comprising:
    verifying a trusted timestamp, within the user authentication token and associated with the user identification service, to verify that the user identification service created the user authentication token within a defined timeframe.

11. The method of claim 1, the validating the user authentication token comprising:
    determining whether the user identification service issuing the user authentication token meets a security threshold for the portable storage device.

12. The method of claim 1, the user authentication token issued by the user identification service.

13. A system for resetting user authentication credentials for a portable storage device, comprising:
a portable storage device comprising instructions that when executed by a processing unit perform operations comprising:
providing a link to a website when a user attempts to log into the portable storage device, the website associated with a user identification service for authenticating the user;
responsive to a selection of the link, initiating navigation to the website;
receiving a user authentication token at the portable storage device responsive to the user identification service authenticating the user;
validating the user authentication token using a signature of the user identification service within the user authentication token; and
responsive to the validating the user authentication token, enabling the user to reset user authentication credentials for the portable storage device.

14. The system of claim 13, the portable storage device having a pre-existing security arrangement with the user identification service.

15. The system of claim 13, the validating the user authentication token comprising validating the user authentication token using shared secret security information that is shared between the portable storage device and the user identification service.

16. A computer-readable storage device comprising processor-executable instructions that when executed perform a method for resetting user authentication credentials for a portable storage device, the method comprising:
providing a link to a website when a user attempts to log into a portable storage device, the website associated with a user identification service for authenticating the user;
responsive to a selection of the link, initiating navigation to the website;
receiving a user authentication token at the portable storage device responsive to the user identification service authenticating the user;
validating the user authentication token using a signature of the user identification service within the user authentication token; and
responsive to the validating the user authentication token, enabling the user to reset user authentication credentials for the portable storage device.

17. The computer-readable storage device of claim 16, the user identification service authenticating the user based upon receipt of user authentication credentials for the user identification service, the user authentication credentials for the user identification service different than the user authentication credentials for the portable storage device.

18. The computer-readable storage device of claim 16, the method comprising:
providing a set of user identification services;
receiving a selection of the user identification service from the set; and
storing the link to the website associated with the user identification service responsive to the receiving the selection.

19. The computer-readable storage device of claim 16, the validating the user authentication token comprising:
verifying, using the signature of the user identification service within the user authentication token, that the user authentication token is issued by the user identification service.

20. The computer-readable storage device of claim 16, the user authentication token issued by the user identification service.

* * * * *